Patented Apr. 14, 1931

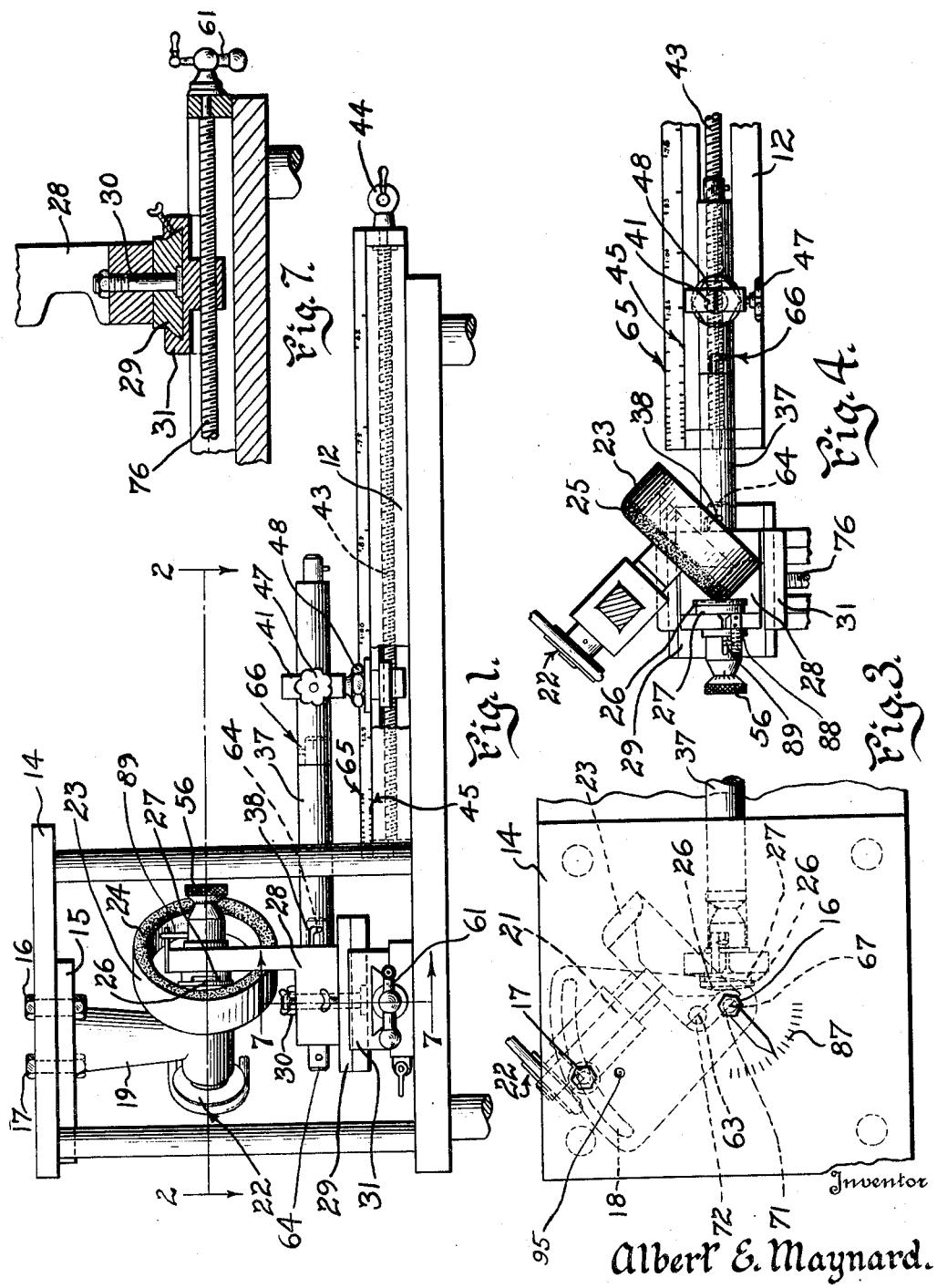

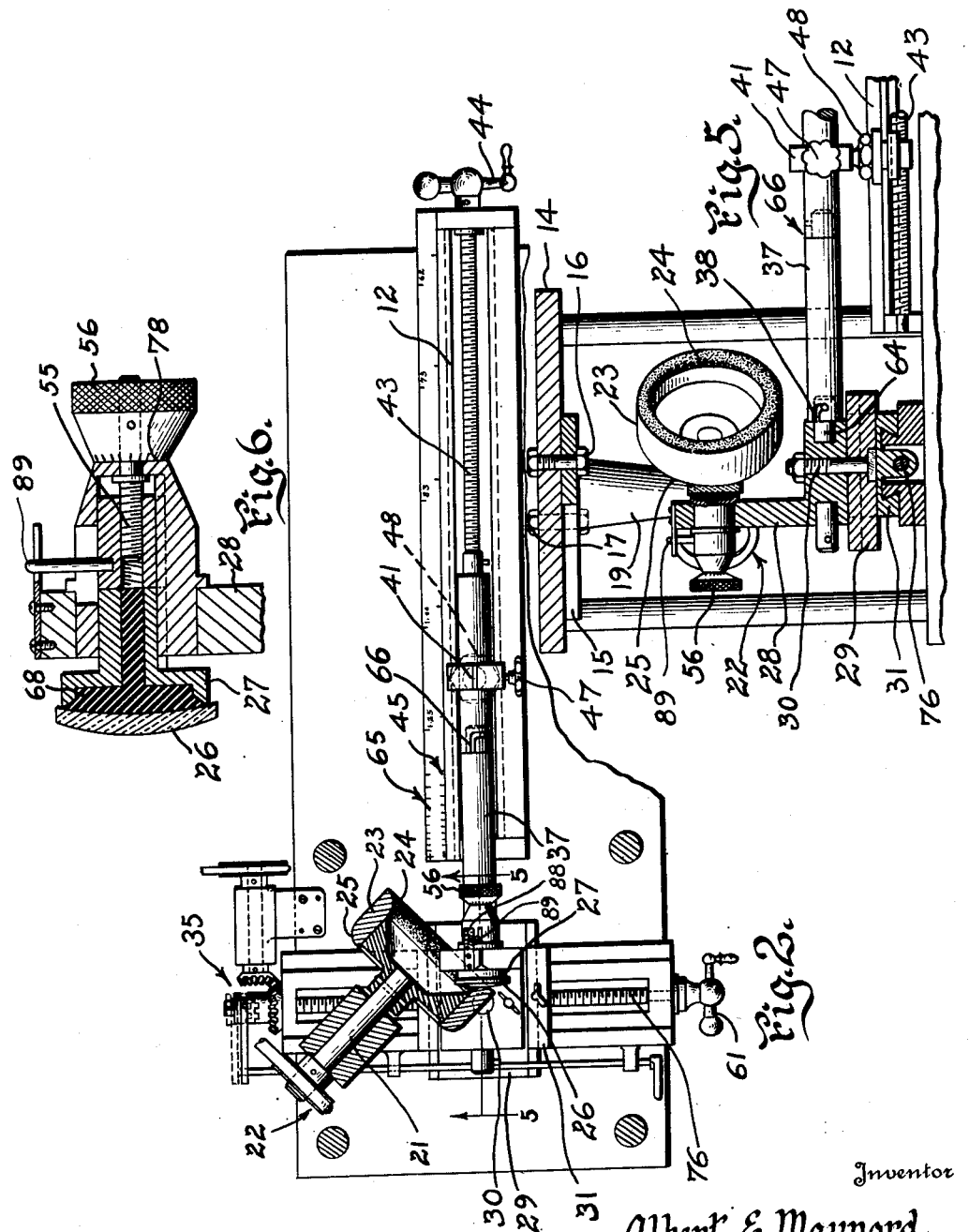

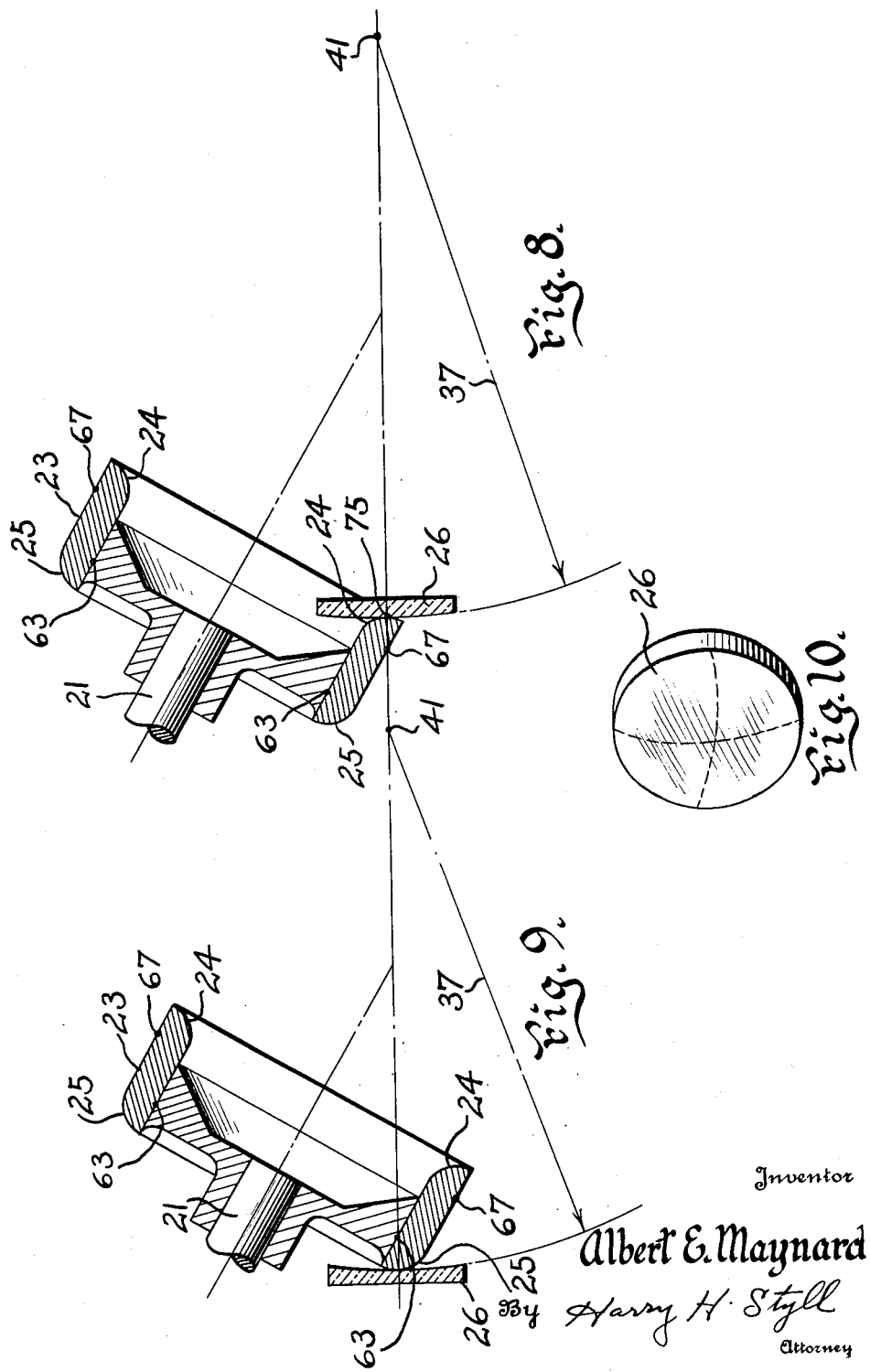

1,800,308

UNITED STATES PATENT OFFICE

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

LENS-SURFACING MACHINE

Application filed November 10, 1926. Serial No. 147,447.

This invention relates to lens surfacing machines and has particular reference to an improved apparatus for producing lenses of single and compound curvatures as well as plano surfaces and to an improved process for producing said lenses and similar articles.

The principal object of the invention is to provide improved means for surfacing lenses of various surface formation, including single and compound curvatures, plano, toric, cylindrical, prismatic, either in flat, concave or convex form.

Another object of the invention is to produce improved means of reducing the number of tools or laps for producing such lens surfaces to a minimum.

Another object is to provide an improved annular ring surfacing tool for surfacing lenses of many different powers and surface shapes both in plano positive and negative forms.

Another object is to provide improved means for controlling the thickness of the finished lens.

Another object is to provide means whereby the feed of the lens being surfaced is constant regardless of the radius of curvature.

Another object is to provide surfacing means whereby the whole commercial range of lenses of all different forms may be made with only two or three different tools, one single tool covering practically the whole range of lenses.

Another object is to provide means for speedily roughing out lenses to shape in a minimum of time and of good curvature and surface requirements.

Another object is to provide a universal lens surfacing machine.

Another object is to provide an improved process for producing lenses.

One of the leading objects of the invention is to provide improved means to reduce the time and labor required in producing lenses, particularly the roughing operations.

Other objects and advantages of the improved machine and process will be apparent by reference to the following specification taken in connection with the accompanying drawings, and it will be understood that I may make many modifications in the specific details of construction shown and described within the scope of the appended claims without departing from or exceeding the spirit of the invention, the preferred forms only having been shown and described by way of illustration.

Referring to the drawings:

Figure 1 is a side elevation of the invention showing the adjustment for the surfacing of convex lenses;

Figure 2 is a top plan view partly shown in section as on line 2—2 of Figure 1;

Figure 3 is a fragmentary plan view of the head showing the adjustment for relating the surfacing tool to the work;

Figure 4 is a fragmentary plan view showing the machine adjusted to surface concave lenses;

Figure 5 is a fragmentary side elevation in section of the machine adjusted to surface concave lenses;

Figure 6 is an enlarged sectional view taken on line 5—5 of Figure 2 showing the work holder and thickness gauge;

Figure 7 is a detail sectional view on line 7—7 of Figure 1 showing the feed mechanism and the pivoted reversible work support;

Figure 8 is a diagrammatic view showing the generation of the curves on a convex lens;

Figure 9 is a similar view showing the generation of the curves on a concave lens;

Figure 10 is a perspective view of a lens showing the planes on which the various curves are generated.

Prior to my invention optical lenses have as a rule been ground and polished on what is known as the lap system. This is in effect a curve transference, the lap transferring to the lens that is being ground a curvature contrageneric to that of the lap. Very few commercial lenses, particularly opthalmic lenses, have been made on what is known as the generative system of grinding, that is, where the curve that is placed on the lens is not transferred as by a lap, but is generated as the grinding proceeds. As stated, the great bulk of ophthalmic lenses, in fact practically all ophthalmic lenses, have been manufactured on the so-called lap process. The grinding of these lenses by laps, particularly the rough grinding before the smoothing and polishing operations take place, has been slow due to the fact of the restricted number of lenses in some instances that can be worked on at one time by the lap. This lap system of grinding also requires an exceedingly large number of tools, in fact a tool concave, convex or plano is required for each curvature that is to be placed on the lens. These tools wear, get out of curve, have to be either re-ground or if worn too badly entirely replaced. The investment in tools in lens manufacture is a very large one indeed.

In my invention I have particularly in mind to provide improved means for overcoming these disadvantages of lap surfacing by reducing the tool investment to practically nothing and by reducing the time and labor involved in the production of these lenses to a point considerably less than those of the prior art. In my device I have particularly considered the rough surfacing, that is, the generating of the curve before the smoothing and polishing operations are performed.

In my improved machine and process I use preferably only one tool for the whole range of lenses that are to be manufactured, whether plano, concave, convex, simple or compound curvatures.

My apparatus is of particular advantage in those shops where prescriptions of various powers have to be ground and where it is not desirable to carry a large number of surfacing tools or laps. In my device the curves being generated are of a more accurate character than those laps which are liable to get out of true due to wear and use. In my machine the lens surface is generated without regard to the surface shape of the tool generating the curvature.

One of the great advantages of the apparatus of this invention is that the lens is surfaced to curvature without a variation in thickness of the lens blank on one side from another. In lap grinding it is often, in fact usually, found that the lens will grind down further on one side than another and the tool has to be shifted or the pressure increased from one side to another to prevent the lens being ground to a wedge shape rather than being centrally ground about its axis. This is a very annoying and expensive defect in lap grinding. Also in the mechanism of this invention provision is made for controlling not only that the lens is ground symmetrically about its axis but is ground to the exact desired thickness, the lens blank being set up in the machine at the start of the operation to the desired point of contact with the surfacing tool and then withdrawn and fed in until the pointer and scale indicate the exact thickness at which point the surfacing of the lens will have been completed, the lens having been ground not only to surface of the required curvature but to the exact thickness intended.

Another great advantage in the present invention lies in the fact that the distance from the center 41 of the radius bar to the point of contact 24 or 25, as the case may be, on the ring tool is always maintained at a constant distance regardless of the angle at which the tool is placed with respect to the lens blank which is being surfaced. It is for this reason that the surfacing faces 24 and 25 of the tool 23 are made arcuate about the respective centers 63 and 67.

Referring more particularly to the drawings, it will be seen that the invention comprises an annular ring surfacing tool adapted to grind concave lenses on one end of the annulus and convex lenses on the other end of the annulus combined with a radius bar lens holder having means to change the radius to required length and to feed the lens across the annular grinding tool on the designated radius, in addition to which there is provided means for angling the annular ring tool and also for turning the lens holder from one side of the annular ring tool to the other so that concave lenses may be ground in one case and convex lenses in the other.

Referring now more specifically to the drawings, the annular ring surfacing tool 23 is mounted on a shaft 21 which is turned by the belt and pulley 22. This ring tool as shown is in cup formation having annular surfacing faces 24 for convex surfaces and 25 for concave surfaces. Either 24 or 25 may be used for plano surfaces. The surfacing faces 24 and 25 are arcuate in form being centered at the points 67 and 63, respectively. The ring tool 23 is mounted for pivotal movement about the center 67 when the surface 24 is being used and about the center 63 when the surface 25 is being used. The curvature of the surface that the ring tool 23 generates is determined by the angle at which the annular surfacing face of the tool is set with respect to the lens being operated upon. This movement is about the pivots 67 and 63 as the case may be, and operates upon the well known ring grinding principle. The ring tool 23 is supported in position by the hangar 19 which is secured to the frame member 14 by the bolts 16 and 17. The top of the hanger 19 has a flange 15 fitted to the under side of the frame member 14. This flange 15 has an arcuate slot 18 and pivot holes 71 and 72, by which the ring tool 23 may be pivoted over the center 67 or the center 63 which centers are the centers of curvature of the arcuate grinding faces 24 and 25 of the grinding tool 23, by shifting the bolts 16 and 17.

The bolt 17 carried by the frame member 14 rides in the slot 18 in the flange 15 and is adapted to lock the tool in the angular position at which it has been set. This ring tool 23 may be made of copper charged with diamond dust, of carborundum or other abrasive materials. In the frame member 14 is another hole 95, Fig 3, adapted to receive the bolt 17. As shown in Fig. 3, the bolt 17 is in the arcuate slot 18 and the bolt 16 is in the hole 71 which corresponds to the center 67 of the grinding face 24 of the ring tool 23. If it is desired to shift to grind on the grinding face 25 of the other end of the tool, the hole 72 corresponding to the center 63 of the grinding face 25 is aligned with the bolt 16 and the arcuate slot 18 is aligned with the opening 95 through which the bolt 17 is then placed, thus providing means for grinding about both centers 63 and 67.

The lens 26 is held in contact with the surfacing face of the ring tool 23 so that it may have an arcuate movement thereacross. This arcuate movement is regulated by the radius rod 37, which slides in a swivelled pivot head 41 which travels on a slide 12, being operated by the screw rod 43. The point of contact with the lens and abrading surface is maintained at a fixed definite point 75 and the length of the radius of curvature is obtained by sliding the pivot head 41 on the radius rod 37 to the required distance and then locking the pivot head on the rod 37 to maintain the required radial length. The screw rod 43 is operated by the handle 44. The radius rod 37 and pivot head 41 are locked together by the retaining screw 47.

The pivot head 41 is locked on the slide 12 by the lock nut 48. The lens 26 is fed transversely across the abrading face of the tool 23 by a feed screw 76 operated either manually by a handle 61 or by a mechanical power feed 35 comprising gears and a clutch, the lens 26 travelling in an arc determined by the radius rod 37 and the position of the pivot head 41. The lens 26 is secured to the lens holder 27 carried by the support 28, which is pivoted at 30 to the slide 29 sliding in the slide way 31 which is engaged by the feed screw 76. The radius rod 37 is also secured to the support 28. The movement of the slide 29 and the slide way 31 are at right angles to each other, hence the transverse movement of the lens 26 is in an arc, the center of which is the pivot head 41. The radius rod 37 is secured to the support 28 by a bayonet joint 38. The support 28 is on the side nearest the pivot head 41 when convex lenses are being surfaced, as shown in Figure 1, and on the opposite side when concave lenses are being surfaced, as shown in Figure 5. The support 28 is turned on the pivot 30. When the support 28 is reversed the lug 64 is engaged by the bayonet joint 38 to the radius rod 37. The radius rod is made in a number of sections joined by bayonet joints as at 66. The length of the radius rod is gauged by the scale 65 for positive lenses and the scale 45 for negative lenses located on the slide way 12 on which the pivot head 41 slides. The angle at which the ring tool 23 is set is gauged by the scale 87 on the frame member 14.

The lens holder consists of an annular chuck 27 which is filled with an adhesive 68 of pitch or the like, to which the lens 26 is secured, the inner face of the lens 26 resting on the face of the annular chuck in true alignment. The chuck 27 is slidably mounted in the support 28 and may be moved back and forth in its bearings by the screw 55 having the head 56. This adjustment is used to regulate the thickness to which the lens 26 is to be surfaced. The thickness is gauged by a scale 88 on the support and a pointer 89, see Figure 4, travelling with the chuck 27 on the screw 55 indicating full millimeters. For fractions of millimeters there is a scale on the head 56 registering with a marking on the support.

To adjust for required thickness of the lens the ring tool is set at the angle for the curve required, as indicated by the scale 87; the radius rod 37 is fulcrumed at 41 to the required radial length indicated by scales 65 or 45 for convex, or concave lenses as the case may be and the chuck 27 drawn back by the screw 55 to clear the ring tool. The lens is then fed towards the ring tool until the pointer 89 registers on the scale 88, the indication marking the required thickness. The distance between zero and the pointer on the scale 88 is the thickness of the lens. If fractions of millimeters are required as well as full millimeters the adjustment for the fraction is made by the scale 78 on the head 56.

Reference to Figures 8 and 9 will indicate the operation of the annular ring tool 23. When a convex lens 26 is surfaced, as shown in Figure 8, the tool is angled about the pivot 67, the abrading action taking place on the front face of the ring tool. When a concave lens is being surfaced the ring tool is angled about the pivot 63, Figure 9, and the abrading action takes place on the rear face of the ring tool these adjustments being made by the bolts 16 and 17.

The operation of the machine in brief is as follows: The lens 26 is secured to the lens holder chuck 27 and brought into contact with the surfacing face of the tool 23, which has been adjusted to the proper angle to give the curvature in one meridian. The length of the radius bar 37 is determined and set by the pivot head 41. The thickness adjustment is made by the screw 55 and the tool rotated and the radius bar carrying the lens fed transversely across the face of the tool by the feed screw 76 and the lens surfaced down to the stop point regulated by the screw 55. The combination of the tool movement and the movement of the radius bar 37 produce the required shape and dimension of surface desired. The adjustment of the ring tool to use its front face or to use its rear face is controlled by pivoting the tool over either center 67 or center 63, as has been described above, by means of the bolts 16 and 17. It will be understood that the tool 23 may surface a great variety of different curvatures depending on the angle the tool is set to the work, hence one such tool could surface practically all of the required commercial curvatures; for convenience in size a set of two or three different sized tools might be used with advantage. By using both the front and rear surfaces of the tool both concave and convex surfaces may be made. By combining the curvatures produced by the ring tool itself and by the radius rod any single or compound regular lens can be produced, such as plano, spherical, toric, cylindrical and prismatic.

To produce a spherical lens the ring tool, the cross feed and the radius rod are used. The ring tool is angled until the pointer on the scale 37 indicates the required power. The radius rod is then set to a center indicated on the scale 65 to the same power, the thickness gauge is then set and the machine set in operation, including the rotation of the ring tool and the cross feed of the radius rod about its center 41.

To produce a plano lens the ring tool and the cross feed are used. The ring tool is adjusted until the abrading face is parallel with the line of movement of the feed 76. The radius bar is disconnected at the bayonet joint 38 and the machine set in operation as above, the cross feed carrying the lens across the ring tool parallel but not on the radius rod about a center. This produces a flat plane surface.

To produce a toric lens, that is to say, a lens having a different curvature in its two major meridians, the ring tool, the cross feed and the radius rod are all used. The ring tool is set at the angle to produce the required curvature in one of the major meridians, as shown on the scale 87. The radius bar is set to a length to produce the curvature of the other major meridian as shown on the scale 65. The thickness gauge is then set and the machine set in operation, the cross feed carrying the lens across the ring tool about the center of the radius rod.

To produce a cylinder lens, that is, a lens that has curvature in one major meridian and no curvature in the other major meridian, the ring tool and the cross feed are used but not the radius bar. The ring tool is set for the cylinder curvature in one major meridian as indicated on the scale 87, the radius rod is disconnected and the lens is fed straight across the face of the tool by the cross feed when the machine has been set in motion, it being understood that in this operation the lens is fed straight across on the feed and has no arcuate movement about the center of the radius rod. The adjustment for thickness is made by the thickness gauge as in the other cases.

To produce a plain prismatic lens set the ring tool as for a plano lens, disconnect the radius rod, set the lens at desired angle on the lens holder and set the machine in motion. The cross feed feeds the lens straight across the ring tool and the prismatic effect is produced by the angle at which the lens is set on the holder. The thickness is determined by the thickness gauge as in other cases.

To produce a curved prismatic lens you proceed exactly as you do in producing the curved non-prismatic lens of the same power, with the exception that the lens is angled on the holder to give the required amount of prism.

The lens may be shifted from the front abrading face of the tool to the rear face by turning the support 28 on the pivot 30, thereby utilizing both faces of the tool as may be required to produce a convex lens in one case and a concave in the other. The operation of the machine is the same in both cases. The radius of the abrading face of the tool is not a fixed radius. Any radius that will provide a good contacting surface may be used. The reason that the tool is pivoted at the center of curvature of the abrading face is that no matter at what angle the said face is related to the lens there will always be provided the same tangent contact surface for operation, and also the distance from the grinding face of the tool 23 to the center 41 of the radius bar 37 is constant regardless of the angle at which the ring tool is set. The curvature produced by the tool depends upon the angle at which the abrading face of the tool is set to the lens. It will also be seen that as the tool is angled on its pivot there will be a different bearing point of the tool on the lens, hence the wear is distributed and the life of the tool enhanced.

From the foregoing it will be seen that I have provided a machine and a process for making lenses that will produce lenses of all different forms and curvatures with the one apparatus and the one tool whether said lenses be plano, concave or convex, simple or compound.

Having described my invention, what I claim is:

1. In a surfacing machine in combination with a work holder, an annular surfacing tool having an arcuate surfacing face on each of its annular ends and means for pivoting the tool for movement about the centers of curvature of the arcuate surfacing faces to engage the work in the work holder at different positions on the arcuate surfacing face whereby the angular relationship of the tool to the work may be changed to regulate the curvature in one major meridian of the work.

2. In a surfacing machine in combination with a work holder, an annual surfacing tool having an arcuate surfacing face on its annular end and means for pivoting the tool for movement about the center of curvature of the arcuate surfacing face to engage the work in the work holder at a desired angular relationship with the surfacing face of the tool to regulate the curvature in one major meridian of the work.

3. In a surfacing machine in combination with a work holder, an annular surfacing tool having an arcuate surfacing face on each of its annular ends, pivot means for the work holder and means for moving the work holder on its pivot to engage the work with either of the arcuate surfacing faces of the tool as desired.

4. In a surfacing machine, a work holder, a pivoted radius member engaging the work holder, means for changing the position of the pivot of the radius member to obtain the desired length of radius, means to move the work holder in an arc about the pivot of the radius member, an annular surfacing tool having an annular surfacing face at each end thereof, means to rotate the tool, and means to pivot the work holder whereby the work may be swung to engage either end of the tool and the annular surfacing faces thereon as desired to produce the required curve.

5. In a surfacing machine, a work holder, a pivoted radius member engaging the work holder, means for changing the position of the pivot of the radius member to obtain the desired length of radius, means to move the work holder in an arc about the pivot of the radius member, an annular surfacing tool having an annular surfacing face at each end thereof, means to rotate the tool, means to move the work holder to engage the work with either surfacing face of the tool as desired, and means to change the angle of the tool to the work in the work holder.

6. In a surfacing machine in combination with a work holder, an annular surfacing tool having an arcuate surfacing face on each end thereof, a support for holding the tool in engagement with the work in the work holder, and means on the support for pivoting the tool for rotative movement about the center of curvature of either arcuate surfacing face as desired and means to pivot the work holder whereby it may be swung to engage the work with the arcuate surfacing face on either end of the tool as desired.

7. In a surfacing machine, a work holder having engaging members on opposed sides thereof, means for pivoting the work holder, an annular surfacing tool having an annular surfacing face on each end thereof means to rotate said tool and a radius rod having engaging means adapted to engage the engaging members on either side of the work holder when the work holder is rotated on its pivot to engage the work in the work holder with either one or the other of the annular surfacing faces of the tool, a pivot for the radius rod and means to move the radius rod about its pivot.

8. In a surfacing machine, a work holder, an annular surfacing tool having an annular surfacing face on each end thereof, a radius rod engaging the work holder, a pivot for the radius rod, means to move the pivot for the radius rod, engaging means on opposed sides of the work holder, means on the radius rod to engage either one or the other of the engaging means on the work holder, means to hold the work holder with the work in engagement with either one or the other of the surfacing faces of the tool as desired, means to adjust the work in the work holder longitudinally of the radius rod to regulate the thickness to which the work is to be surfaced, and means to move the work holder in an arc about the pivot of the radius rod to carry the work across the surfacing face of the tool.

9. In a surfacing machine in combination with a work holder, an annular surfacing tool having an arcuate surfacing face on each of its annular ends, the center of curvature of the arcuate surfacing face of one end being adjacent the outer side of the annulus and the center of curvature of the arcuate surfacing face on the other end being adjacent the inner side of the annulus, and means for pivoting the tool for movement about the centers of curvature of the arcuate surfacing faces to change the angular relationship of the tool to the work to regulate the curvature in one major meridian of the work.

10. In a surfacing machine, a work holder having radius rod engaging members on opposite sides thereof, an annular surfacing tool having an annular surfacing face on each end thereof, means for supporting the tool in surfacing relation with the work holder, means to rotate the tool, a pivoted radius rod having an engaging member adapted to engage the radius rod, engaging members on the two sides of the work holder, means for pivoting the work holder whereby the work may be swung to engage the surfacing face on either end of the tool, and means for moving the pivot of the radius rod to position to give the required radius for the end of the tool that is in operation.

11. In a surfacing machine, a work holder having engaging members on opposed sides thereof, means for pivoting the work holder, an annular surfacing tool having an annular surfacing face on each end thereof, means to rotate the said tool and a sectional radius rod having engaging means adapted to engage the engaging members on either side of the work holder when the work holder is rotated on its pivot to engage the work in the work holder at either one or the other of the annular surfacing faces of the tool, a pivot for the radius rod, and means to move the radius rod about its pivot.

ALBERT E. MAYNARD.